United States Patent
Mougin et al.

(10) Patent No.: US 9,663,633 B2
(45) Date of Patent: *May 30, 2017

(54) COMPOSITION BASED ON NATURAL RUBBER AND ON A POLYALDIMINE COMPOUND

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Catherine Mougin, Clermont-Ferrand (FR); Justin Belz, Clermont-Ferrand (FR); Jose Carlos Araujo Da Silva, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/377,023

(22) PCT Filed: Jan. 29, 2013

(86) PCT No.: PCT/EP2013/051658
§ 371 (c)(1),
(2) Date: Aug. 6, 2014

(87) PCT Pub. No.: WO2013/117458
PCT Pub. Date: Aug. 15, 2013

(65) Prior Publication Data
US 2015/0018469 A1    Jan. 15, 2015

(30) Foreign Application Priority Data
Feb. 7, 2012 (FR) ...................................... 12 51137

(51) Int. Cl.
C08K 5/29 (2006.01)
C08K 3/36 (2006.01)
C08L 7/00 (2006.01)

(52) U.S. Cl.
CPC .................. *C08K 5/29* (2013.01); *C08K 3/36* (2013.01); *C08L 7/00* (2013.01)

(58) Field of Classification Search
CPC ..................................... C08K 5/29; C08K 3/36
USPC .......................................................... 524/237
See application file for complete search history.

(56) References Cited

U.S. PATENT DOCUMENTS

| | | |
|---|---|---|
| 2003/0105242 A1 | 6/2003 | Penot |
| 2008/0154020 A1 | 6/2008 | Yan et al. |
| 2012/0165449 A1* | 6/2012 | Araujo Da Silva et al. . 524/237 |
| 2012/0196960 A1 | 8/2012 | Araujo Da Silva |

FOREIGN PATENT DOCUMENTS

| | | | |
|---|---|---|---|
| FR | 2804120 | 7/2001 | |
| JP | 02-117939 | * 5/1990 | ................ C08L 7/00 |
| JP | 2009-057475 | * 3/2009 | .............. C08L 15/00 |
| WO | 2011/003981 | 1/2011 | |

OTHER PUBLICATIONS

English Translation of JP 02-117939. May 1990.*
Machine translation of JP 2009-057475. Mar. 2009.*
International Search Report for PCT/EP2013/051658 dated Jun. 5, 2013.

* cited by examiner

*Primary Examiner* — John Uselding
(74) *Attorney, Agent, or Firm* — Dickinson Wright PLLC

(57) ABSTRACT

A reinforced rubber composition based at least on an elastomeric matrix comprising natural rubber, on a reinforcing filler and on a polyaldimine compound of general formula (I), in which the $R_1$, $R_2$ and A elements are variable groups. This composition is intended in particular for the manufacture of semi-finished products for tires.

7 Claims, No Drawings

COMPOSITION BASED ON NATURAL RUBBER AND ON A POLYALDIMINE COMPOUND

This application is a 371 national phase entry of PCT/EP2013/051658, filed 29 Jan. 2013, which claims benefit of FR 1251137, filed 7 Feb. 2012, the entire contents of which are incorporated herein by reference for all purposes.

BACKGROUND

1. Field

The present disclosure relates to reinforced rubber compositions based on natural rubber and having improved hysteresis properties in the vulcanized state. These rubber compositions are intended, for example, for the manufacture of a semi-finished rubber product intended for the tires of land and air vehicles.

2. Description of Related Art

Ever since savings in fuel and the need to protect the environment have become a priority, it has proved necessary to produce tires having a rolling resistance which is as low as possible, without having a disadvantageous effect on their wear resistance. This has been made possible in particular by virtue of the use, in the rubber compositions, of specific inorganic fillers capable of competing, from the reinforcing viewpoint, with an organic filler, such as conventional tire-grade carbon black, while giving these compositions a lower hysteresis, synonymous with a lower rolling resistance for the tires comprising them.

To further reduce the rolling resistance remains, in the current economic and ecological context, a permanent concern despite the low levels respectively achieved both with the specific inorganic fillers described as "reinforcing" and with a carbon black. Numerous trails have already been explored in order to further lower the hysteresis of the rubber compositions reinforced with such reinforcing fillers. Mention may be made, by way of example, of the addition of compounds such as polyamines or polyketimines, such as is proposed by the Applicant Companies in Patent Applications WO 2011/003983 and WO 2011/003981.

Patent Application JP2117939 for its part provides rubber compositions comprising compounds exhibiting an imine functional group borne in particular by an aromatic nucleus. These compounds make it possible to reduce the generation of heat in the compositions.

In order to improve both the properties of the tires and the productive output in the manufacturing lines, it is desirable for manufacturers to find other solutions, in order to obtain tires having a rolling resistance which is as low as possible, but also for these tires to be produced in the easiest possible manner.

SUMMARY

The inventors have discovered, during their research studies, that, in a rubber composition based on natural rubber as main elastomer and reinforced either with an organic filler, such as carbon black, or with a reinforcing inorganic filler, such as silica, or also a blend of organic and inorganic fillers, the addition of certain polyaldimine compounds confers improved hysteresis properties on these vulcanized compositions. This significant decrease in the hysteresis observed in the context of the compositions comprising a polyaldimine compound is also accompanied by an improvement in the rubber properties and in particular in the processability of the compositions.

The significantly improved hysteresis properties and processability of such compositions in accordance with the invention, based on natural rubber and on a polyaldimine compound, make these compositions particularly suitable for the manufacture of semi-finished rubber products, such as treads, tread underlayers, rubbers for coating metal or textile reinforcers, or rubbers for sidewalls intended for tires, for example of ground motor vehicles, such as tires of vehicles of heavy-duty type.

Thus, an embodiment of the present invention is a reinforced rubber composition based at least on an elastomeric matrix comprising natural rubber, on a reinforcing organic or inorganic filler or on a blend of the two, on a coupling agent, in the event of use of a reinforcing inorganic filler, and on a polyaldimine compound of general formula (I):

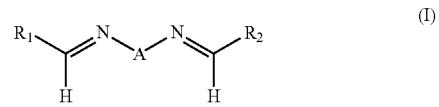

in which:
$R_1$ and $R_2$ independently represent identical or different groups chosen from alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms; which groups can optionally be interrupted by heteroatoms and/or substituted, A represents a hydrocarbon group comprising at least 3 carbon atoms (preferably from 3 to 18 carbon atoms), optionally interrupted by heteroatoms and optionally substituted, it being understood that the A group does not represent an aromatic nucleus directly bonded to the structure of the compound of general formula (I); that is to say that the nitrogen atoms appearing in the general formula (I) and adjacent to the A group are not directly bonded to an aromatic nucleus of the A group; provided that this condition is observed, it is, of course, possible for the A group to furthermore comprise an aromatic nucleus.

An embodiment of the invention is preferably a composition as defined above in which the polyaldimine compound is present in a proportion of between 0.1 and 20 mmol per 100 g of elastomer, preferably ranging from 1 to 10 mmol per 100 g of elastomer.

The invention preferably relates, in an embodiment, to a composition as defined above in which the natural rubber content is at least 50 phr.

Preferably, an embodiment of the invention is a composition as defined above in which the natural rubber content is 100 phr.

Preferably again, an embodiment of the invention is a composition as defined above in which the reinforcing filler comprises an organic filler, for example carbon black, in a proportion ranging from 55% to 100% by weight of the total weight of the reinforcing filler.

Preferably, an embodiment of the invention is a composition as defined above in which the reinforcing filler comprises an inorganic filler, for example a reinforcing silica, and in that the composition additionally comprises a coupling agent.

Preferably again, an embodiment of the invention is a composition as defined above in which the reinforcing filler comprises a reinforcing inorganic filler in proportions ranging from 55% to 100% by weight of the total weight of the reinforcing filler.

More preferably, an embodiment of the invention is a composition as defined above in which $R_1$ and $R_2$ independently represent identical or different groups chosen from alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms; which groups can optionally be substituted.

More preferably again, an embodiment of the invention is a composition as defined above in which $R_1$ and $R_2$ each represent an aryl radical having from 6 to 24 carbon atoms and preferably a phenyl radical which is optionally substituted.

According to a preferred embodiment, an embodiment of the invention is a composition as defined above in which A represents a hydrocarbon group comprising from 3 to 18 carbon atoms which is optionally interrupted by heteroatoms and optionally substituted, it being understood that the A group does not represent an arylene radical.

Preferably, an embodiment of the invention is a composition as defined above in which A represents an alkylene or cycloalkylene group comprising from 3 to 18 carbon atoms which is optionally interrupted by heteroatoms and optionally substituted; or an aralkylene comprising from 8 to 18 carbon atoms which is optionally interrupted by heteroatoms and optionally substituted, it being understood that, in the carbon-based alkylene or aralkylene chains which are optionally interrupted by heteroatoms and optionally substituted, there may be double or triple bonds between the carbon atoms.

Preferably again, an embodiment of the invention is a composition as defined above in which A represents an alkylene group comprising from 3 to 12 carbon atoms, more preferably from 3 to 8 carbon atoms, this radial optionally being substituted.

More preferably, an embodiment of the invention is a composition as defined above in which the $R_1$, $R_2$ and A groups can be interrupted by heteroatoms chosen from S, O and N, preferably N or O.

More preferably again, an embodiment of the invention is a composition as defined above in which the $R_1$, $R_2$ and A groups are not interrupted by heteroatoms.

Preferably, an embodiment of the invention is a composition as defined above in which the $R_1$, $R_2$ and A groups can be substituted by radicals, such as alkyl, cycloalkyl, cycloalkylalkyl, aryl, aralkyl, hydroxyl, alkoxy, amino, carboxyl or carbonyl radicals.

Preferably again, an embodiment of the invention is a composition as defined above in which the A group can be substituted by one or more aldimine entities of formula (II) and/or by one or more radicals, such as alkyl, cycloalkyl, cycloalkylalkyl or aralkyl radicals, themselves substituted by one or more aldimine entities of formula (II):

(II)

in which $R_3$ is defined independently as $R_1$ and $R_2$ are defined and the arrow represents the point of attachment of the radical or radicals of formula (II) with the atom which bears them.

Very preferably, an embodiment of the invention is a composition as defined above in which the compound of general formula (I) is chosen from the compounds bearing 2, 3 or 4 aldimine entities.

More preferably still, an embodiment of the invention is a composition as defined above in which the polyaldimine compound is chosen from the following compounds:
N,N'-bis[phenylmethylene]hexane-1,6-diamine,
N,N'-bis[phenylmethylene]octane-1,8-diamine,
N,N'-bis[phenylmethylene]cyclohexane-1,4-diamine,
N,N'-bis[phenylmethylene]cyclohexane-1,2-diamine,
N,N,N-tris(2-{[phenylmethylene]amino}ethyl)amine,
N,N'-bis[(4-diethylaminophenyl)methylene]hexane-1,6-diamine,
N,N'-bis[(4-methoxyphenyl)methylene]hexane-1,6-diamine,
N,N'-bis[(2-diethylaminophenyl)methylene]hexane-1,6-diamine,
N,N'-bis[(2-methoxyphenyl)methylene]hexane-1,6-diamine,
N,N'-bis[mesitylmethylene]hexane-1,6-diamine,
N,N'-bis[(4-methylphenyl)methylene]hexane-1,6-diamine,
N,N'-bis[(2,4,6-triisopropylphenyl)methylene]hexane-1,6-diamine,
N,N'-bis[(2,4,6-tri{tert-butyl}phenyl)methylene]hexane-1,6-diamine,
N,N'-bis[(2,4,6-tricyclohexylphenyl)methylene]hexane-1,6-diamine,
N,N'-bis[(2,6-diisopropyl-4-methylphenyl)methylene]hexane-1,6-diamine,
N,N'-bis[(2,6-di{tert-butyl}-4-methylphenyl)methylene]hexane-1,6-diamine,
N,N'-bis[(2,6-dicyclohexyl-4-methylphenyl)methylene]hexane-1,6-diamine,
N,N'-bis[(4-diethylaminophenyl)methylene]octane-1,8-diamine,
N,N'-bis[mesitylmethylene]octane-1,8-diamine,
N,N'-bis[(4-methylphenyl)methylene]octane-1,8-diamine.

Another embodiment of the invention is a semi-finished rubber product for a tire, comprising a crosslinkable or crosslinked rubber composition as defined above.

Another embodiment of the invention is a tire which comprises a semi-finished product as defined above.

DETAILED DESCRIPTION OF SPECIFIC EMBODIMENTS

For greater clarity on reading the following, the expression "composition based on" should be understood as meaning a composition comprising the mixture and/or reaction product of the various constituents used, some of these based constituents being capable of reacting or intended to react with one another, at least in part, during the various phases of manufacture of the composition, in particular during the crosslinking or vulcanization thereof.

In the present description, unless expressly indicated otherwise, all the percentages (%) shown are % by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

Furthermore, the amounts of the components of the invention can be expressed in phr, that is to say in parts (by weight) per 100 parts by weights of elastomer.

I. DETAILED DESCRIPTION OF THE COMPOSITIONS OF EMBODIMENTS OF THE INVENTION

An embodiment of the invention relates to a reinforced rubber composition based on at least one elastomeric matrix comprising at least natural rubber predominantly, on a reinforcing filler and on a polyaldimine compound corresponding to the formula (I) described above.

I.1. Elastomer

According to embodiments of the invention, the elastomeric matrix of the composition is predominantly based on natural rubber (NR). In some cases, the elastomeric matrix can advantageously be entirely composed of natural rubber (100% of the elastomeric matrix is composed of natural rubber). This alternative form is particularly employed when it is a matter of using the rubber composition to manufacture sidewalls, treads for tires of utility vehicles, such as heavy-duty vehicles, or also some applications, such as ice or snow, of passenger vehicles, or also to manufacture metal reinforcer/rubber composites, such as, for example, crown or carcass plies.

Thus, the elastomeric matrix is preferably a matrix 100% composed of natural rubber, that is to say that the composition comprises 100 phr (parts by weight per 100 parts of elastomer) of NR. According to another preferred embodiment, the matrix can also comprise, in addition to natural rubber, at least one other diene elastomer.

This or these other diene elastomers are then present in the matrix in proportions of between 0% and 50% by weight (the limits of this range being excluded), preferably from 5% to 40%, more preferably still from 15% to 40%.

In the case of a blending with at least one other diene elastomer, the fraction by weight of natural rubber in the elastomeric matrix is predominant. Preferably, the fraction by weight is greater than or equal to 50% by weight of the total weight of the matrix, more preferably still from 60% to 85% by weight of the total weight of the matrix.

Predominant fraction by weight according to the invention refers to the highest fraction by weight of the blend. Thus, in a ternary NR/elastomer A/elastomer B blend, the fractions by weight can be distributed according to the proportions 45/30/25 or 40/40/20 or 40/30/30, the predominant fractions by weight respectively being 45 or 40, and, in a binary NR/elastomer blend, the fractions by weight can be distributed according to the proportions 50/50 or 70/30, the predominant fractions by weight being 50 or 70.

The term "diene elastomer" should be understood according to the invention as meaning any, optionally functionalized, natural rubber or any synthetic elastomer resulting at least in part from diene monomers. More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units.

The diene elastomer constituting a portion of the elastomeric matrix according to embodiments of the invention is preferably chosen from the group of highly unsaturated diene elastomers consisting of polybutadienes (BR), butadiene copolymers, polyisoprenes (PI), isoprene copolymers and the mixtures of these elastomers. Such copolymers are more preferably chosen from the group consisting of copolymers of butadiene and of a vinylaromatic monomer, more particularly the butadiene/styrene copolymer (SBR), isoprene/butadiene copolymers (BIR), copolymers of isoprene and of a vinylaromatic monomer, more particularly the isoprene/styrene copolymer (SIR), and isoprene/butadiene/styrene copolymers (SBIR). Particular preference is given, among these copolymers, to copolymers of butadiene and of a vinylaromatic monomer, more particularly the butadiene/styrene copolymer (SBR).

The diene elastomer constituting a portion of the elastomeric matrix according to embodiments of the invention may or may not be star-branched, coupled or functionalized, in a way known per se, by means of functionalization, coupling or star-branching agents known to a person skilled in the art. Mention may be made, for example, among others more conventional, of the elastomers coupled according to the processes described in the patent applications on behalf of the Applicant Companies WO 08/141,702, FR 2 291 064, FR 2 291 065 and FR 07/60442.

I.2. Reinforcing Filler

The rubber composition according to embodiments of the invention comprises a reinforcing filler, preferably in proportions ranging from 35 to 200 phr. Preferably, the content of total reinforcing filler is between 40 and 140 phr, more preferably between 45 and 130 phr, the optimum being, in a known way, different according to the specific applications targeted for the tire; the expected level of reinforcement with regard to a bicycle tire, for example, is, of course, lower than that required with regard to a tire capable of running at high speed in a sustained manner, for example a motorcycle tire, a tire for a passenger vehicle or a tire for a utility vehicle, such as a heavy-duty vehicle.

The reinforcing filler is composed of a reinforcing organic filler, such as carbon black, or of a reinforcing inorganic filler, such as reinforcing silica, or of an organic filler/inorganic filler blend, according to the application targeted.

For example, in the rubber composition according to embodiments of the invention, the reinforcing filler can comprise an organic filler, for example carbon black, in a proportion ranging from 55% to 100% by weight of the total weight of the reinforcing filler. Furthermore, the reinforcing filler can comprise an inorganic filler, for example a reinforcing silica, in which case the composition can preferably comprise, in addition, a coupling agent. Also, the reinforcing filler can comprise a reinforcing inorganic filler in proportions ranging from 55% to 100% by weight of the total weight of the reinforcing filler.

The term "reinforcing inorganic filler" should be understood in the present patent application, by definition, as meaning any inorganic or mineral filler, whatever its colour or its origin (natural or synthetic), also known as "white filler", "clear filler", indeed even "non-black filler", in contrast to a conventional organic filler, such as carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The silica used can be any reinforcing silica known to a person skilled in the art, in particular any precipitated or fumed silica exhibiting a BET specific surface and a CTAB specific surface both of less than 450 m$^2$/g, even if highly dispersible precipitated silicas are preferred. Mention will also be made, as reinforcing inorganic filler, of mineral fillers of the aluminous type, in particular alumina ($Al_2O_3$) or aluminium (oxide)hydroxides, or also reinforcing titanium oxides.

The physical state under which the reinforcing inorganic filler is provided is immaterial, whether in the powder, microbead, granule or bead form. Of course, the term "reinforcing inorganic filler" is also understood to mean mixtures of different reinforcing inorganic fillers, in particular of highly dispersible silicas as described above.

All carbon blacks, in particular blacks of the HAF, ISAF, SAF, FF, FEF, GPF and SRF types, conventionally used in tire rubber compositions ("tire-grade" blacks) are suitable as reinforcing organic filler. Mention will more particularly be made, among reinforcing organic filler, of the reinforcing carbon blacks of the 100, 200 or 300 series (ASTM grades), such as, for example, the N115, N134, N234, N326, N330, N339, N347 or N375 blacks, but also coarser blacks, such as, for example, the N550 or N683 blacks. The carbon blacks might, for example, be already incorporated in the natural rubber in the form of a masterbatch.

The black/silica blends or the blacks partially or fully covered with silica are suitable for forming the reinforcing filler. Carbon blacks modified by silica, such as, without implied limitation, the fillers which are sold by Cabot under the name "CRX 2000", and which are described in the international patent document WO-A-96/37547, are also suitable.

Mention may be made, as examples of reinforcing organic fillers other than carbon blacks, of functionalized polyvinylaromatic organic fillers, such as described in Applications WO-A-2006/069792 and WO-A-2006/069793, or also of functionalized nonaromatic polyvinyl organic fillers, such as described in Applications WO-A-2008/003434 and WO-A-2008/003435.

In the case where the reinforcing filler comprises only a predominant reinforcing inorganic filler and carbon black, the fraction by weight of this carbon black in the said reinforcing filler is more preferably chosen to be less than or equal to 30%, with respect to the total weight of the reinforcing filler.

In the case where the reinforcing filler comprises a reinforcing inorganic filler, the rubber composition according to embodiments of the invention preferably comprises a coupling agent for coupling the reinforcing inorganic filler to the natural rubber and to the optional diene elastomers of which the elastomeric matrix is composed.

The term "coupling agent" is understood to mean more specifically an agent capable of establishing a satisfactory bond of chemical and/or physical nature between the filler under consideration and the elastomer, while facilitating the dispersion of this filler in the elastomeric matrix. Such an at least bifunctional bonding agent has, for example, as simplified general formula, "Y-T-X", in which:

Y represents a functional group ("Y" functional group) which is capable of being bonded physically and/or chemically to the inorganic filler, it being possible for such a bond to be established, for example, between a silicon atom of the coupling agent and the surface hydroxyl (—OH) groups of the inorganic filler (for example the surface silanols, when silica is concerned);

X represents a functional group ("X" functional group) capable of being bonded physically and/or chemically to the elastomer, for example via a sulphur atom;

T represents a divalent group which makes it possible to connect Y and X.

"Covering" agents for the inorganic filler particles can also be used. They are capable of further improving, by being bonded to the surface functional sites of the inorganic filler and by thus at least partially covering it, the dispersion of the latter in the elastomeric matrix, thus lowering its viscosity in the raw and improving overall its processability in the raw state.

Such covering agents belong essentially to the family of the polyols (for example diols or triols, such as glycerol or its derivatives), polyethers (for example polyethylene glycols), primary, secondary or tertiary amines (for example trialkanolamines), hydroxylated or hydrolysable polyorganosiloxanes, for example α,ω-dihydroxy-polyorganosilanes (in particular α,ω-dihydroxypolydimethylsiloxanes), hydroxysilanes or alkylalkoxysilanes, in particular alkyltriethoxysilanes, such as, for example, (1-octyl)triethoxysilane, sold by Degussa-Evonik under the name "Dynasylan Octeo". These covering agents are well known in tire rubber compositions reinforced with an inorganic filler; they have been described, for example, in Patent Applications WO 00/05300, WO 01/55252, WO 01/96442, WO 02/031041, WO 02/053634, WO 02/083782, WO 03/002648, WO 03/002653, WO 03/016387, WO 2006/002993, WO 2006/125533, WO 2007/017060 and WO 2007/003408.

The bonding agents must not be confused with simple agents for covering the filler under consideration which, in a known way, can comprise the Y functional group active with regard to the filler but are devoid of the X functional group active with regard to the elastomer. Use may be made of any bonding agent known for or capable of efficiently providing, in the rubber compositions which can be used for the manufacture of tires, the bonding (or the coupling) between a reinforcing inorganic filler, such as silica, and a diene elastomer, such as, for example, organosilanes, in particular alkoxysilane polysulphides or mercaptosilanes, or polyorganosiloxanes bearing the abovementioned X and Y functional groups. Silica/elastomer bonding agents, in particular, have been described in a large number of documents, those well known being bifunctional alkoxysilanes, such as alkoxysilane polysulphides. Use is made in particular of silane polysulphides, known as "symmetrical" or "unsymmetrical" according to their specific structure, such as described, for example, in Applications WO 03/002648 (or US 2005/016651) and WO 03/002649 (or US 2005/016650).

Mention will more particularly be made, as examples of silane polysulphides, of bis(3-trimethoxysilylpropyl) or bis (3-triethoxysilylpropyl) polysulphides. Use is made in particular, among these compounds, of bis(3-triethoxysilylpropyl)tetrasulphide, abbreviated to TESPT, or bis(3-triethoxysilylpropyl) disulphide, abbreviated to TESPD. Mention will also be made, as preferred examples, of bis(mono($C_1$-$C_4$)alkoxydi-($C_1$-$C_4$)alkylsilylpropyl) polysulphides (in particular disulphides, trisulphides or tetrasulphides), more particularly bis(monoethoxydimethylsilylpropyl) tetrasulphide, as described in Patent Application WO 02/083782 (or US 2004/132880).

Mention will in particular be made, as coupling agent other than alkoxysilane polysulphide, of bifunctional POSs (polyorganosiloxanes), or of hydroxysilane polysulphides, such as described in Patent Applications WO 02/30939 (or U.S. Pat. No. 6,774,255) and WO 02/31041 (or US 2004/051210), or of silanes or POSs bearing azodicarbonyl functional groups, such as described, for example, in Patent Applications WO 2006/125532, WO 2006/125533 and WO 2006/125534.

Mention will be made, as examples of other silane sulphides, for example, of other silanes bearing at least one thiol (SH) functional group (referred to as mercaptosilanes) and/or at least one blocked thiol functional group, such as described, for example, in Patents or Patent Applications U.S. Pat. No. 6,849,754, WO 99/09036, WO 2006/023815 and WO 2007/098080.

Of course, use might also be made of mixtures of the coupling agents described above, as described in particular in Application WO 2006/125534.

In the compositions in accordance with embodiments of the invention, the content of coupling agent is advantageously less than 20 phr. The content thereof is preferably between 0.5 and 12 phr, more preferably from 3 to 10 phr, in particular from 4 to 7 phr. This content is easily adjusted by a person skilled in the art according to the content of inorganic filler used in the composition.

A person skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, such as, for example, without implied limitation, the fillers which are sold by Cabot under the name "CRX 2000", and which are described in the international patent document WO-A-96/37547, or else comprises, at its surface, functional sites, in particular hydroxyl sites, requiring the use of a coupling agent in order to establish the bond between the filler and the elastomer.

The rubber compositions in accordance with embodiments of the invention can also comprise, in addition to coupling agents, coupling activators, agents for covering the inorganic fillers, as described above, or more generally processing aids capable, in a known way, by virtue of an improvement in the dispersion of the filler in the rubber matrix and of a lowering in the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

I.3. Polyaldimine

The compositions of the invention use a polyaldimine compound of general formula (I):

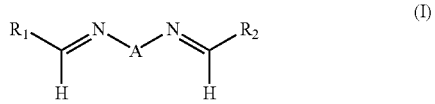

in which:
R$_1$ and R$_2$ independently represent identical or different groups chosen from alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms; which groups can optionally be interrupted by heteroatoms and/or substituted, A represents a hydrocarbon group comprising at least 3 carbon atoms (preferably from 3 to 18 carbon atoms), optionally interrupted by heteroatoms and optionally substituted, it being understood that the A group does not represent an aromatic nucleus directly bonded to the structure of the compound of general formula (I); that is to say that the nitrogen atoms appearing in the general formula (I) and adjacent to the A group are not directly bonded to an aromatic nucleus of the A group; provided that this condition is observed, it is, of course, possible for the A group to furthermore comprise an aromatic nucleus.

Preferably, R$_1$ and R$_2$ independently represent identical or different groups chosen from alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms; which groups can optionally be substituted. More preferably, R$_1$ and R$_2$ each represent an aryl radical having from 6 to 24 carbon atoms and more preferably still a phenyl radical which is optionally substituted.

Preferably again, A represents a hydrocarbon group comprising from 3 to 18 carbon atoms which is optionally interrupted by heteroatoms and optionally substituted, it being understood that the A group does not represent an arylene radical. More preferably, A represents an alkylene or cycloalkylene group comprising from 3 to 18 carbon atoms which is optionally interrupted by heteroatoms and optionally substituted; or an aralkylene comprising from 8 to 18 carbon atoms which is optionally interrupted by heteroatoms and optionally substituted, it being understood that, in the carbon-based alkylene or aralkylene chains which are optionally interrupted by heteroatoms and optionally substituted, there may be double or triple bonds between the carbon atoms. Very preferably, A represents an alkylene group comprising from 3 to 12 carbon atoms, more preferably from 3 to 8 carbon atoms (in particular 6 carbon atoms), this radical optionally being substituted.

As indicated in the preceding sections, the R$_1$, R$_2$ and A groups can optionally be interrupted by heteroatoms, such as S, O or N, preferably N or O. Within the meaning of the present invention, the term "group which is interrupted by heteroatoms" should be understood as meaning a group which comprises, between its end atoms (which are carbon atoms, as defined by the definitions of the hydrocarbon groups in question), one or more heteroatoms as provided above. Preferably, the R$_1$, R$_2$ and A groups are not interrupted by heteroatoms.

As indicated in the preceding sections, the R$_1$, R$_2$ and A groups can be substituted. The radicals substituting these groups can be common radicals known to a person skilled in the art, such as alkyl (preferably methyl, tert-butyl or isopropyl), cycloalkyl (preferably cyclohexyl), cycloalkylalkyl, aryl, aralkyl, hydroxyl, alkoxy, amino, carboxyl or carbonyl radicals.

Furthermore, A can also be substituted by one or more aldimine entities of formula (II) and/or by one or more radicals, such as alkyl, cycloalkyl, cycloalkylalkyl or aralkyl radicals, themselves substituted by one or more aldimine entities of formula (II):

in which $R_3$ is defined independently as $R_1$ and $R_2$ are defined above, the arrow representing the point of attachment of the radical or radicals of formula (II) with the atom which bears them.

Thus, the compounds of formula (I) comprise at least two aldimine entities and can comprise more of them, for example three or four, according to the nature of the radicals substituting the A group.

According to a preferred embodiment, the compounds of formula (I) comprise two aldimine entities, that is to say that the A group is not substituted by the radicals comprising one or more aldimine entities of formula (II) as defined above.

According to another preferred embodiment, the compounds of formula (I) comprise more than two aldimine entities, that is to say that the A group is substituted by a radical comprising one or more aldimine entities of formula (II) as defined above.

More preferably, these polyaldimine compounds are chosen from the following compounds:

N,N'-bis[phenylmethylene]hexane-1,6-diamine,
N,N'-bis[phenylmethylene]octane-1,8-diamine,
N,N'-bis[phenylmethylene]cyclohexane-1,4-diamine,
N,N'-bis[phenylmethylene]cyclohexane-1,2-diamine,
N,N,N-tris(2-{[phenylmethylene]amino}ethyl)amine,
N,N'-bis[(4-diethylaminophenyl)methylene]hexane-1,6-diamine,
N,N'-bis[(4-methoxyphenyl)methylene]hexane-1,6-diamine,
N,N'-bis[(2-diethylaminophenyl)methylene]hexane-1,6-diamine,
N,N'-bis[(2-methoxyphenyl)methylene]hexane-1,6-diamine,
N,N'-bis[mesitylmethylene]hexane-1,6-diamine,
N,N'-bis[(4-methylphenyl)methylene]hexane-1,6-diamine,
N,N'-bis[(2,4,6-triisopropylphenyl)methylene]hexane-1,6-diamine,
N,N'-bis[(2,4,6-tri{tert-butyl}phenyl)methylene]hexane-1,6-diamine,
N,N'-bis[(2,4,6-tricyclohexylphenyl)methylene]hexane-1,6-diamine,
N,N'-bis[(2,6-diisopropyl-4-methylphenyl)methylene]hexane-1,6-diamine,
N,N'-bis[(2,6-di{tert-butyl}-4-methylphenyl)methylene]hexane-1,6-diamine,
N,N'-bis[(2,6-dicyclohexyl-4-methylphenyl)methylene]hexane-1,6-diamine,
N,N'-bis[(4-diethylaminophenyl)methylene]octane-1,8-diamine,
N,N'-bis[mesitylmethylene]octane-1,8-diamine,
N,N'-bis[(4-methylphenyl)methylene]octane-1,8-diamine.

Use is preferably made, as polyaldimine compounds, of the dialdimine, trialdimine and tetra-aldimine compounds. These compounds and their process of preparation are described in the state of the art essentially either to improve the abrasion resistance of rubber compositions intended for the manufacture of vehicle tires, and mention may be made, in this regard, of the abovementioned Patent Application JP 2006063206 A1, or for the preparation of resins according to the process described in U.S. Pat. No. 3,668,183.

The polyaldimine compounds can, for example, be synthesized by condensing an amine with an aldehyde. This method of preparation of aldimines is described in "Advanced Organic Chemistry, Part B: Reactions and Synthesis" by F. A. Carey and R. J. Sundberg, 4th Edition, pp. 31-33, and also in "Advanced Organic Chemistry, Reactions, Mechanisms, and Structure" by J. March, 5th Edition, pp. 1185-1187, and in the references cited by these works.

For example, if the dialdimines are considered, those of the general formula (I) can in particular be prepared by the condensation of a diamine and of one or two aldehydes, simultaneously or successively, according to whether the molecule is symmetrical or asymmetrical.

The same type of synthesis is applicable to the synthesis of polyaldimines by using the appropriate starting reactants, for example triamines for trialdimines of general formula (I), tetramines for tetra-aldimines of general formula (I), and the like.

As regards the compounds of general formula (I), the amines used for the synthesis of these products are compounds comprising at least two amine functional groups. As such, these compounds can be diamines or polyamines, such as triamines, tetramines, and the like.

Mention may be made, as example of diamines of use in the synthesis of dialdimines for the invention, for example, of 1,2-propylenediamine, 3,3'-dimethyl-4,4'-diaminodicyclohexylmethane, 4,4'-diaminodicyclohexylmethane, isophoronediamine, neopentanediamine, 2,2-dimethylpropane-1,3-diamine, 1,8-octamethylenediamine, 1,3-diaminopropane, 1,6-hexamethylenediamine, 1,2-diaminocyclohexane, 1,3-diaminocyclohexane or 1,4-diaminocyclohexane and preferably 1,8-octamethylenediamine, 1,6-hexamethylenediamine, 1,2-diaminocyclohexane or 1,4-diaminocyclohexane.

Mention may also be made, for example, of 4,7,10-trioxatridecane-1,13-diamine, 4,9-dioxadodecane-1,12-diamine, N3-amine (3-(2-aminoethylamino)propylamine), diethylenetriamine, dipropylenetriamine, N,N-bis(3-aminopropyl)methylamine, N4-amine (N,N'-bis(3-aminopropyl)ethylenediamine), 2,4-diamino-6-methyl-1,3,5-triazine, 2,4-diamino-6-phenyl-s-triazine, melamine, triethylenetetramine, tetraethylenepentamine, 2,2',2"-nitrilotriéthylamine, 3,6-dioxaoctane-1,8-diamine, N,N,N-tris(2-aminoethyl)amine, bis(3-aminopropyl)tetramethyldisiloxane, 2-(2-aminoethoxy)ethaneamine, 3-{2-[2-(3-aminopropoxy)ethoxy]ethoxy}propan-1-amine, 3-[4-(3-aminopropoxy)phenoxy]propan-1-amine, 3-{2-(3-aminopropoxy)-1-[(3-aminopropoxy)methyl]ethoxy}propan-1-amine, 2-({2-[(2-aminophenyl)thio]ethyl}thio)aniline, 2-[(3-{[(2-aminophenyl)thio]methyl}-2,4,6-trimethylbenzyl)thio]aniline or 2-({4-[(2-aminophenyl)thio]but-2-enyl}thio)aniline and preferably N,N-bis(2-aminoethyl)ethane-1,2-diamine.

Mention may be made, as example of triamines and tetramines of use in the synthesis of trialdimines and tetra-aldimines for the invention, of tris(2-aminoethyl)amine, N,N-bis(2-aminoethyl)-N-{2-[(2-aminoethyl)amino]ethyl}amine, N,N-bis(2-aminoethyl)butane-1,4-diamine, N,N-bis(2-aminoethyl)-N-{2-[bis(2-aminoethyl)amino]-ethyl}amine, 2-(aminomethyl)hexane-1,6-diamine, 2,2-bis(aminomethyl)hexane-1,6-diamine, 2,5-bis(aminomethyl)hexane-1,6-diamine, 3,5-diaminocyclohexylamine or 1-[3,5-bis(aminomethyl)phenyl]methanamine.

Mention may be made, as example of aldehydes of use in the synthesis of trialdimines and tetra-aldimines for the invention, of benzaldehyde, 4-methoxybenzaldehyde, 4-(diethylamino)benzaldehyde, 4-methylbenzaldehyde, 2-methoxybenzaldehyde, 2,4-dimethoxybenzaldehyde, 2,4-dimethylbenzaldehyde, 2,4,6-trimethyl-benzaldehyde, 2,6-diisopropyl-4-methylbenzaldehyde, 2,4,6-triisopropylbenzaldehyde, 2,6-di(tert-butyl)-4-methylbenzaldehyde, 2,4,6-tri(tert-butyl)benzaldehyde, 1-naphthaldehyde, 2,6-dicyclohexyl-4-methylbenzaldehyde, 2,4,6-tricyclohexylbenzaldehyde, 2-naphthaldehyde, 1,1'-biphenyl-2-carbaldehyde, 1H-indole-5-carbaldehyde, 5-methylthiophene-2-carbaldehyde, 3,5-dimethyl-1H-pyrrole-2-carbaldehyde, 1-ethyl-1H-pyrrole-2-carbaldehyde or 1H-indole-3-carbaldehyde, quinoline-4-carbaldehyde.

The rubber composition of the tire component according to embodiments of the invention comprises the polyaldimine compound in an amount of between 0.1 and 20 mmol per 100 g of elastomer, preferably ranging from 1 to 10 mmol per 100 g of elastomer and more preferably ranging from 2 to 8 mmol per 100 g of elastomer. The term "the polyaldimine compound" according to the invention should be understood as meaning a compound or a mixture of several compounds corresponding to the formula (I).

I.4. Various Additives

The rubber compositions in accordance with embodiments of the invention can also comprise all or a portion of the usual additives generally used in elastomer compositions intended for the manufacture of tires, such as, for example, pigments, protection agents, such as antiozone waxes, chemical antiozonants or antioxidants, antifatigue agents, reinforcing or plasticizing resins, methylene acceptors (for example, phenolic novolak resin) and methylene donors (for example, HMT or H3M), such as described, for example, in Application WO 02/10269, a crosslinking system based either on sulphur or on sulphur donors and/or on peroxides and/or on bismaleimides, vulcanization accelerators, vulcanization activators, adhesion promoters, such as cobalt-based compounds, plasticizing agents, preferably nonaromatic or very slightly aromatic plasticizing agents chosen from the group consisting of naphthenic oils, paraffinic oils, MES oils, TDAE oils, ether plasticizers, ester plasticizers (for example, glycerol trioleates) and hydrocarbon resins exhibiting a high Tg, preferably of greater than 30° C., such as described, for example, in Applications WO 2005/087859, WO 2006/061064 and WO 2007/017060, and the mixtures of such compounds.

II. PREPARATION

The embodiments of the invention also relate to a process for the preparation of a rubber composition as described above.

It should be pointed out that, according to the invention, the polyaldimine compound can be incorporated, on an open device of open mill type (external mixer) or on a closed device of internal mixer type, at any point in the process for the preparation of the rubber composition described below, including during the manufacture of the natural rubber on the site for the production thereof.

The composition is manufactured in appropriate mixers using two successive preparation phases well known to a person skilled in the art: (i) a first phase of thermomechanical working or kneading (phase referred to as "non-productive") at high temperature, up to a maximum temperature of between 130° C. and 200° C., preferably between 145° C. and 185° C., followed by (ii) a second phase of mechanical working (phase referred to as "productive") down to a lower temperature, typically of less than 110° C., for example between 40° C. and 100° C., also known as finishing phase, during which the crosslinking system is incorporated. The term "crosslinking system" is understood to mean, without distinction, the crosslinking agents conventionally used with inorganic fillers and the vulcanization agents conventionally used, such as sulphur, and the vulcanization accelerators.

By way of example, the first (non-productive) phase is carried out in a single thermomechanical stage, during which the introduction is carried out, in an appropriate mixer, such as an internal mixer, in a first step, at a temperature of between 60° C. and 110° C., for example of the order of 80° C., of the diene elastomer or elastomers and then, in a second step, for example after kneading for approximately 30 seconds, of the reinforcing filler, the polyaldimine compound, the optional additional processing aids and the other additives, with the exception of the crosslinking or vulcanization system. The total duration of the kneading, in this non-productive phase, is preferably of between 2 and 6 minutes with a dropping temperature of the order of 165° C.

After cooling the mixture thus obtained, the vulcanization system is then incorporated at a temperature of between 20° C. and 50° C., for example of the order of 40° C., generally in an external mixer, such as an open mill; the combined mixture is then mixed (productive phase) for a few minutes, for example between 2 and 6 minutes.

The process for preparing a rubber composition according to embodiments of the invention comprises at least the following stages:
(i) carrying out, at a maximum temperature of between 130° C. and 200° C., preferably between 145° C. and 185° C., for a period of time preferably of between 2 and 6 minutes, a first step of thermomechanical working (sometimes described as "non-productive" phase) of the necessary base constituents of the rubber composition, including polyaldimine compound(s), with the exception of the crosslinking system, by intimately incorporating, by kneading in one or more stages, constituents of the composition in the elastomeric matrix based on natural rubber, then
(ii) carrying out, at a temperature lower than the said maximum temperature of the said first step, preferably of less than 110° C. (sometimes described as "productive" phase), for a period of time preferably of between 2 and 6 minutes, a second step of mechanical working, advantageously in an open mill, during which the said crosslinking system is incorporated.

The polyaldimine compound corresponding to the formula (I) described above can thus be incorporated:
either as additive during the manufacture of the natural rubber on the site for the production thereof,
or as ingredient of the rubber composition according to the invention:
during the preliminary preparation of a natural rubber/polyaldimine masterbatch on an open device of open mill type (external mixer) or on a closed device of internal mixer type,
without preliminary preparation of a masterbatch, directly in the mixer, of external or internal, with the other compounds of the rubber composition.

This is why, according to an alternative form of the process, the said alternative form comprises, prior to carrying out the abovementioned stage (i), the stages of the conventional manufacture of natural rubber which comprises the addition of the polyaldimine compound corresponding to the formula (I).

Another alternative form of the process according to an embodiment of the invention comprises, prior to carrying out the abovementioned stage (i), the stage of preparation of a masterbatch based on natural rubber and on the polyaldimine compound corresponding to the formula (I).

According to another alternative form of the process of the invention, all the base constituents of the composition of the invention, including the polyaldimine compound but with the exception of the vulcanization system, are incorporated during the first stage (i), the "non-productive" phase.

The final composition thus obtained can subsequently be calandered, for example in the form of a sheet or of a plaque, or also extruded, for example in order to form a rubber profiled element which can be used as semi-finished rubber product intended for tires.

Another subject-matter of the invention is a tire which incorporates, in at least one of its constituent components, a reinforced rubber composition according to the invention.

A subject-matter of the invention is very particularly a semi-finished rubber product, comprising a reinforced rubber composition according to the invention, intended for these tires.

Due to the reduced hysteresis which characterizes a reinforced rubber composition according to the invention in comparison with a hysteresis of the composition devoid of polyaldimine compound, it should be noted that a tire having a tread comprising the composition according to the invention exhibits improved hysteresis properties, in particular makes it possible to significantly reduce the initial hysteresis of the composition, synonymous with an advantageously reduced rolling resistance.

Due to the reduced hysteresis which characterizes a rubber composition according to an embodiment of the invention in comparison with the composition devoid of polyaldimine compound, it should also be noted that a tire, the sidewalls or all or part of the inner compositions of which comprise the composition of the invention, exhibits a significantly reduced self-heating and consequently an improved endurance. The term "inner compositions" is understood to mean the compositions intended for the manufacture of crown reinforcing plies, carcass reinforcing plies, beads, protectors, underlayers, rubber blocks and other internal rubbers, in particular decoupling rubbers, intended to provide the bonding or the interface between the abovementioned regions of tires.

The tires in accordance with embodiments of the invention are in particular intended for passenger vehicles or for industrial vehicles chosen from vans, heavy-duty vehicles, i.e. underground, bus, heavy road transport vehicles (lorries, tractors, trailers) or off-road vehicles, heavy agricultural vehicles or earth moving equipment, planes, and other transportation or handling vehicles.

The abovementioned characteristics of the embodiments of the present invention, and others, will be better understood on reading the following description of several implementational examples of the invention, given by way of illustration and without implied limitation.

III. EXAMPLES

III.1. Measurements and Tests Used

The rubber compositions are characterized before and after curing, as indicated below:

a) The Mooney viscosity (ML 1+4) at 100° C.: measured according to Standard ASTM: D-1646, entitled "Mooney" in the tables, b) Scorch time (or prevulcanization time): The measurements are carried out at 130° C., in accordance with French Standard NF T 43-005. The change in the consistometric index as a function of time makes it possible to determine the scorch time of the rubber compositions, assessed in accordance with the abovementioned standard, by the parameter T5 (case of a large rotor), expressed in minutes, and as defined being the time necessary to obtain an increase in the consistometric index (expressed in MU) of 5 units above the minimum value measured for this index.

c) The dynamic properties $\Delta G^*$ and $\tan(\delta)$ max are measured on a viscosity analyser (Metravib VA4000) according to Standard ASTM D 5992-96. The response of a sample of vulcanized composition (cylindrical test specimen with a thickness of 2 mm and with a cross section of 79 $mm^2$), subjected to a simple alternating sinusoidal shear stress, at a frequency of 10 Hz, under the standard temperature conditions (23° C.) according to Standard ASTM D 1349-99, is recorded. A peak-to-peak strain amplitude sweep is carried out from 0.1% to 50% (outward cycle) and then from 50% to 0.1% (return cycle). The results made use of are the complex dynamic shear modulus ($G^*$) and the loss factor tan $\delta$. The maximum value of tan $\delta$ observed ($\tan(\delta)$ max), and the difference in complex modulus ($\Delta G^*$) between the values at 0.1% and 50% strain (Payne effect), are shown for the return cycle.

III.2. Synthesis of the Polyaldimines

The polyaldimine N,N'-bis[phenylmethylene]hexane-1,6-diamine (CAS: [3009-40-3]) used in the examples which follow can be prepared according to the synthesis described by Kamalov et al. in J. Gen. Chem. USSR (Engl. Transl.), Vol. 62, No. 6.2, (1992), pp. 1395-1402, 1147-1153.

III.3. Implementational Examples of the Invention

The purpose of the implementational example is to compare the properties of a composition in accordance with embodiments of the invention, comprising a polyaldimine compound in accordance with an embodiment of the invention, with a composition which is identical but which does not comprise polyaldimine compound; the control composition can be a conventional composition not comprising additive, or it can be a composition comprising a polyketimine, such as provided by the Applicant Companies in a prior patent application (WO 2011/003981). The procedure for preparing the compositions is as described above and it is the same for all the compositions tested.

III.3.1. Example 1

Example 1 shows the improved properties (hysteresis and processability) of a composition in accordance with embodiments of the invention when the reinforcing filler is 100% an inorganic filler, such as silica.

The compositions tested exhibit the formulation given in Table 1 (expressed in phr: parts per hundred parts of elastomer). In the compositions C2 and C3, the molar amount of polyketimine and of polyaldimine is the same; as their molar masses are slightly different, the value shown in phr differs slightly for one and the same molar amount.

TABLE 1

| | Composition | | |
|---|---|---|---|
| | C1 | C2 | C3 |
| Diene elastomer (1) | 100 | 100 | 100 |
| Silica (2) | 55 | 55 | 55 |
| Silane (3) | 4.5 | 4.5 | 4.5 |
| Antioxidant (4) | 4 | 4 | 4 |
| Paraffin | 1 | 1 | 1 |
| Stearic acid (5) | 1.5 | 1.5 | 1.5 |
| ZnO (6) | 3 | 3 | 3 |

TABLE 1-continued

| | Composition | | |
|---|---|---|---|
| | C1 | C2 | C3 |
| Accelerator (7) | 1.1 | 1.1 | 1.1 |
| Sulphur | 1.1 | 1.1 | 1.1 |
| Polyketimine (8) | 0 | 2.7 | 0 |
| Polyaldimine (9) | 0 | 0 | 2.2 |

(1) Natural rubber
(2) Zeosil 1165 MP from Rhodia "HDS" type
(3) TESPT (Si69 from Degussa)
(4) N-(1,3-dimethylbutyl)-N'-phenyl-p-phenylenediamine, Santoflex 6-PPD from Flexsys
(5) Pristerene 4931 from Uniqema
(6) Industrial grade from Umicore
(7) CBS from Flexsys
(8) N,N'-Bis(1-isobutyl-3-methylbutylidene)hexane-1,6-diamine, the formula of which is given below (synthesis as described in WO 2011/003981), i.e. 7.5 mmol (MW = 364 g/mol)

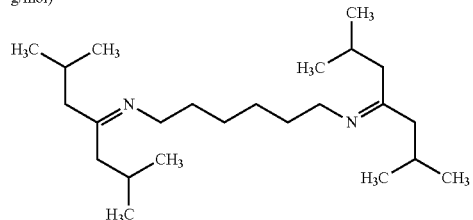

(9) N,N'-Bis[phenylmethylene]hexane-1,6-diamine, the formula of which is given below, i.e. 7.5 mmol (MW = 292 g/mol)

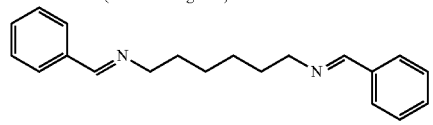

Each of the following compositions is prepared, in a first step, by thermomechanical working (non-productive phase) and then, in a second finishing step, by mechanical working, as described above (productive phase).

The first abovementioned step of thermomechanical working is thus carried out, it may specify that the mean speed of the blades during this first step is 70 rev/min. The optional polyaldimine or polyketimine are introduced during this phase.

The mixture thus obtained is recovered and cooled and then, in an external mixer (homofinisher), the sulphur and the sulphenamide are added at 40° C., the combined mixture also being mixed for a period of time of from 3 to 4 minutes (second abovementioned step of mechanical working).

The compositions thus obtained are subsequently calandered, either in the form of plates (with a thickness ranging from 2 to 3 mm) or thin sheets of rubber, for the measurement of their physical or mechanical properties.

The results obtained are presented in Table 2 below:

TABLE 2

| | Composition | | |
|---|---|---|---|
| | C1 | C2 | C3 |
| Properties in the noncrosslinked state | | | |
| ML 1 + 4 at 100° C. | 100 | 135 | 123 |
| Prevulcanization at 130° C. | 100 | 20 | 58 |
| Dynamic properties | | | |
| $\Delta G^*$ at 23° C. | 100 | 66 | 76 |
| $\tan(\delta)$max at 23° C. | 100 | 95 | 89 |

As regards the dynamic properties, it should be noted that the values for $\Delta G^*$ and $\tan(\delta)$ max of the compositions C2 and C3 are lower than those of the control composition C1. Thus, the presence of a polyketimine or of a polyaldimine makes it possible to improve the hysteresis properties in comparison with the control C1, without introduction of polyaldimine or polyketimine compound.

Furthermore, it should be noted that the compositions C2 and C3 exhibit a Mooney value for the mixture before curing which is greater than that of the control composition C1.

In other words, the compositions C2 and C3 exhibit rubber properties in the crosslinked state which are improved with respect to those of the composition C1 as a result of a markedly reduced hysteresis. This is particularly true for the composition C3, which exhibits a fall of 11% in the $\tan(\delta)$ max value at 23° C., representative of the rolling resistance of the tire provided with this composition.

If the composition C3 in accordance with the invention is now compared with the composition C2, it is observed that the improvement in the dynamic properties is greater for the composition C3, whereas the Mooney value for the composition C3 is significantly lower than that for C2, corresponding to greater ease of processing. This is confirmed by a higher prevulcanization at 130° C. for C3 than for C2, which value represents the safety towards scorching of the composition, the property which allows the composition not to crosslink excessively early during the manufacturing process.

Thus, the compromising performance between rolling resistance and ease of processing is highly advantageous for the composition C3, in accordance with the invention, in comparison with the controls C1 and C2.

III.3.2. Example 2

Example 2 shows the improved properties (hysteresis and processability) of a composition in accordance with an embodiment of the invention when the reinforcing filler is 100% an organic filler, such as carbon black.

The compositions tested exhibit the formulation given in Table 1 (expressed in phr: parts per hundred parts of elastomer). In the compositions C5 and C6, the molar amount of polyketimine and of polyaldimine is the same; as their molar masses are slightly different, the value shown in phr differs slightly for one and the same molar amount.

TABLE 1

| | Composition | | |
|---|---|---|---|
| | C4 | C5 | C6 |
| Diene elastomer (1) | 100 | 100 | 100 |
| Carbon black (2) | 55 | 55 | 55 |
| Antioxidant (3) | 4 | 4 | 4 |
| Paraffin | 1 | 1 | 1 |
| Stearic acid (4) | 1.5 | 1.5 | 1.5 |
| ZnO (5) | 3 | 3 | 3 |
| Accelerator (6) | 1.1 | 1.1 | 1.1 |
| Sulphur | 1.1 | 1.1 | 1.1 |
| Polyketimine (7) | 0 | 0.93 | 0 |
| Polyaldimine (8) | 0 | 0 | 0.75 |

(1) Natural rubber
(2) Carbon black N234
(3) N-(1,3-dimethylbutyl)-N'-phenyl-p-phenylenediamine (Santoflex 6-PPD from Flexsys)
(4) Pristerene 4931 from Uniqema
(5) Industrial grade from Umicore
(6) CBS from Flexsys
(7) N,N'-Bis(1-isobutyl-3-methylbutylidene)hexane-1,6-diamine, the formula of which is given below (synthesis as described in WO 2011/003981), i.e. 2.5 mmol (MW = 364 g/mol)

TABLE 1-continued

| | Composition | | |
|---|---|---|---|
| | C4 | C5 | C6 |

(structure of bis-ketimine with two isobutyl-substituted imine groups linked by hexamethylene chain)

(8) N,N'-Bis[phenylmethylene]hexane-1,6-diamine, the formula of which is given below, i.e. 2.5 mmol (MW = 292 g/mol)

(structure of N,N'-bis[phenylmethylene]hexane-1,6-diamine)

Each of the following compositions is prepared, in a first step, by thermomechanical working and then, in a second finishing step, by mechanical working.

The first abovementioned step of thermomechanical working is thus carried out, it may specify that the mean speed of the blades during this first step is 70 rev/min. The optional polyaldimine or polyketimine are introduced during this phase.

The mixture thus obtained is recovered and cooled and then, in an external mixer (homofinisher), the sulphur and the sulphenamide are added at 40° C., the combined mixture also being mixed for a period of time of from 3 to 4 minutes (second abovementioned step of mechanical working).

The compositions thus obtained are subsequently calandered, either in the form of plates (with a thickness ranging from 2 to 3 mm) or thin sheets of rubber, for the measurement of their physical or mechanical properties.

Results Obtained:

TABLE 2

| | Composition | | |
|---|---|---|---|
| | C4 | C5 | C6 |
| Properties in the noncrosslinked state | | | |
| ML 1 + 4 at 100° C. | 100 | 116 | 110 |
| Prevulcanization at 130° C. | 100 | 48 | 63 |
| Dynamic properties | | | |
| ΔG* at 23° C. | 100 | 94 | 90 |
| tan(δ)max at 23° C. | 100 | 93 | 96 |

As regards the dynamic properties, it should be noted that the values for ΔG* and tan(δ) max of the compositions C5 and C6 are lower than those of the control composition C1. Thus, the presence of a polyketimine or of a polyaldimine makes it possible to improve the hysteresis properties in comparison with the control C4, without introduction of polyaldimine or polyketimine compound.

Furthermore, it should be noted that the compositions C5 and C6 exhibit a Mooney value for the mixture before curing which is greater than that of the control composition C4.

In other words, the compositions C5 and C6 exhibit rubber properties in the crosslinked state which are improved with respect to those of the composition C4 as a result of a markedly reduced hysteresis.

If the composition C6 in accordance with the invention is now compared with the composition C5, it is observed that the improvement in the dynamic properties is potentially greater for the composition C6, whereas the Mooney value for the composition C6 is significantly lower than that for C5, corresponding to greater ease of processing. This is confirmed by a higher prevulcanization at 130° C. for C6 than for C5, which value represents the safety towards scorching of the composition, the property which allows the composition not to crosslink excessively early during the manufacturing process.

Thus, the compromising performance between rolling resistance and ease of processing is highly advantageous for the composition C6, in accordance with the invention, in comparison with the controls C4 and C5.

The invention claimed is:

1. A reinforced rubber composition based at least on an elastomeric matrix comprising natural rubber, said natural rubber present in said elastomeric matrix in an amount of from over 50 phr to 100 phr, a reinforcing filler present in an amount of from 35 to 200 phr in said elastomeric matrix and a polyaldimine compound of general formula (I):

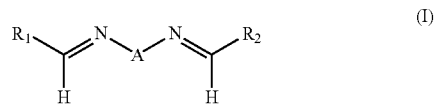

wherein:
R$_1$ and R$_2$ independently represent identical or different groups chosen from alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms; which groups can optionally be interrupted by heteroatoms and/or substituted, A represents a hydrocarbon group comprising at least 3 carbon atoms, optionally interrupted by heteroatoms and optionally substituted, wherein the A group does not represent an aromatic nucleus directly bonded to the structure of the compound of general formula (I), wherein the polyaldimine compound is chosen from the following compounds:
N,N'-bis[phenylmethylene]hexane-1,6-diamine,
N,N'-bis[phenylmethylene]octane-1,8-diamine,
N,N'-bis[phenylmethylene]cyclohexane-1,4-diamine,
N,N'-bis[phenylmethylene]cyclohexane-1,2-diamine,
N,N,N-tris(2-{[phenylmethylene]amino}ethyl)amine,
N,N'-bis[(4-diethylaminophenyl)methylene]hexane-1,6-diamine,
N,N'-bis[(4-methoxyphenyl)methylene]hexane-1,6-diamine,
N,N'-bis[(2-diethylaminophenyl)methylene]hexane-1,6-diamine,
N,N'-bis[(2-methoxyphenyl)methylene]hexane-1,6-diamine,
N,N'-bis[mesitylmethylene]hexane-1,6-diamine,
N,N'-bis[(4-methylphenyl)methylene]hexane-1,6-diamine,
N,N'-bis[(2,4,6-triisopropylphenyl)methylene]hexane-1,6-diamine,
N,N'-bis[(2,4,6-tri {tert-butyl}phenyl)methylene]hexane-1,6-diamine,
N,N'-bis[(2,4,6-tricyclohexylphenyl)methylene]hexane-1,6-diamine, N,N'-bis[(2,6-diisopropyl-4-methylphenyl)methylene]hexane-1,6-diamine,
N,N'-bis[(2,6-di{tert-butyl}-4-methylphenyl)methylene]hexane-1,6-diamine,
N,N'-bis[(2,6-dicyclohexyl-4-methylphenyl)methylene]hexane-1,6-diamine,
N,N'-bis[(4-diethylaminophenyl)methylene]octane-1,8-diamine,
N,N'-bis[mesitylmethylene]octane-1,8-diamine, and
N,N'-bis[(4-methylphenyl)methylene]octane-1,8-diamine, and wherein said polyaldimine compound is present at a level of from 0.1 to 20 millimoles per 100 grams of elastomeric matrix and said reinforcing filler comprises at least one inorganic reinforcing filler and a coupling agent, said inorganic reinforcing filler having hydroxyl groups, said coupling agent comprising at least one functional group that bonds to said hydroxyl groups of said inorganic reinforcing filler and at least one functional group that bonds to said natural rubber.

2. The rubber composition according to claim 1, wherein the natural rubber content is 100 phr.

3. The rubber composition according to claim 1, wherein the reinforcing filler further comprises an organic reinforcing filler.

4. The rubber composition according to claim 1, wherein the coupling agent is present in an amount of less than 20 phr.

5. The rubber composition according to claim 1, wherein the reinforcing filler comprises the inorganic reinforcing filler in proportions ranging from 55% to 100% by weight of the total weight of the reinforcing filler.

6. A semi-finished rubber product for a tire, comprising a crosslinkable or crosslinked rubber composition according to claim 1.

7. A tire, comprising a semi-finished product according to claim 6.

* * * * *